United States Patent [19]
Lawson

[11] Patent Number: 5,853,510
[45] Date of Patent: Dec. 29, 1998

[54] METHOD FOR MANUFACTURING A COMPOSITE

[75] Inventor: Henry J. Lawson, Clinton Township, Mich.

[73] Assignee: Blue Water Plastics, Inc., Marysville, Mich.

[21] Appl. No.: 950,326

[22] Filed: Oct. 14, 1997

Related U.S. Application Data

[63] Continuation of Ser. No. 354,288, Dec. 12, 1994, abandoned.

[51] Int. Cl.$^6$ ............................ B32B 31/00; G05G 15/00
[52] U.S. Cl. ........................... 156/64; 156/82; 156/309.9; 156/322; 156/359; 156/366; 156/497
[58] Field of Search ................... 156/64, 82, 309.6, 156/309.9, 322, 359, 366, 497

[56] References Cited

U.S. PATENT DOCUMENTS

| | | | |
|---|---|---|---|
| 4,125,490 | 11/1978 | Hettinga | 521/51 |
| 4,131,664 | 12/1978 | Flowers et al. | 264/510 |
| 4,249,983 | 2/1981 | Fujii | 156/475 |
| 4,307,057 | 12/1981 | Hettinga | 264/328.8 |
| 4,325,767 | 4/1982 | Graves et al. | 156/196 |
| 4,397,806 | 8/1983 | Hettinga | 264/328.14 |
| 4,474,635 | 10/1984 | Adams | 156/245 |
| 4,613,475 | 9/1986 | Hettinga | 264/328.1 |
| 4,642,153 | 2/1987 | Lohr | 156/296 |
| 4,676,938 | 6/1987 | Karklin et al. | 264/46.5 |
| 4,687,526 | 8/1987 | Wilfert | 156/64 |
| 4,743,323 | 5/1988 | Hettinga | 156/160 |
| 4,769,278 | 9/1988 | Kamimura et al. | 428/282 |
| 4,826,552 | 5/1989 | Breitscheidel et al. | 156/322 X |
| 4,855,004 | 8/1989 | Chitjian | 156/359 |
| 4,923,539 | 5/1990 | Spengler et al. | 156/79 |
| 4,931,121 | 6/1990 | Raspor et al. | 156/213 |
| 4,983,247 | 1/1991 | Kim | 156/309.6 X |
| 5,007,767 | 4/1991 | Stafford | 156/309.6 X |
| 5,110,387 | 5/1992 | Jasinski et al. | 156/309.9 X |
| 5,110,532 | 5/1992 | Hettinga | 264/257 |
| 5,139,714 | 8/1992 | Hettinga | 264/45.1 |
| 5,151,237 | 9/1992 | Hettinga | 264/257 |
| 5,198,053 | 3/1993 | Duncan | 156/64 |
| 5,217,561 | 6/1993 | Ueda et al. | 156/359 |
| 5,219,498 | 6/1993 | Keller et al. | 156/64 X |
| 5,225,025 | 7/1993 | Lambing et al. | 156/358 |
| 5,275,764 | 1/1994 | Hettinga | 264/1.9 |
| 5,300,361 | 4/1994 | Vowinkel et al. | 156/82 X |
| 5,316,604 | 5/1994 | Fell | 156/82 |

FOREIGN PATENT DOCUMENTS

| | | | |
|---|---|---|---|
| 36383 | 3/1979 | Japan | 156/82 |
| 2024099 | 1/1980 | United Kingdom | 156/82 |

*Primary Examiner*—David A. Simmons
*Assistant Examiner*—Paul M. Rivard
*Attorney, Agent, or Firm*—M. Michael Hamburg

[57] ABSTRACT

A method of making a composite comprises applying controlled heating to a bonding surface of a preformed substantially rigid thermoplastic substrate to cause the bonding surface to flow, without causing substantial heat soaking, melting, or other damage to a residue portion of the substrate, or a second component known as a bonding layer. The method further comprises causing pressurized contact at an interface between the bonding surface and the bonding layer, while the bonding surface is in a flow state. The invention further contemplates an apparatus for making a composite, comprising a heater capable of applying controlled heating to the bonding surface, and a bonding device in communication with the heater for creating pressurized contact at the interface between the bonding surface and the bonding layer, following controlled heating.

36 Claims, 4 Drawing Sheets

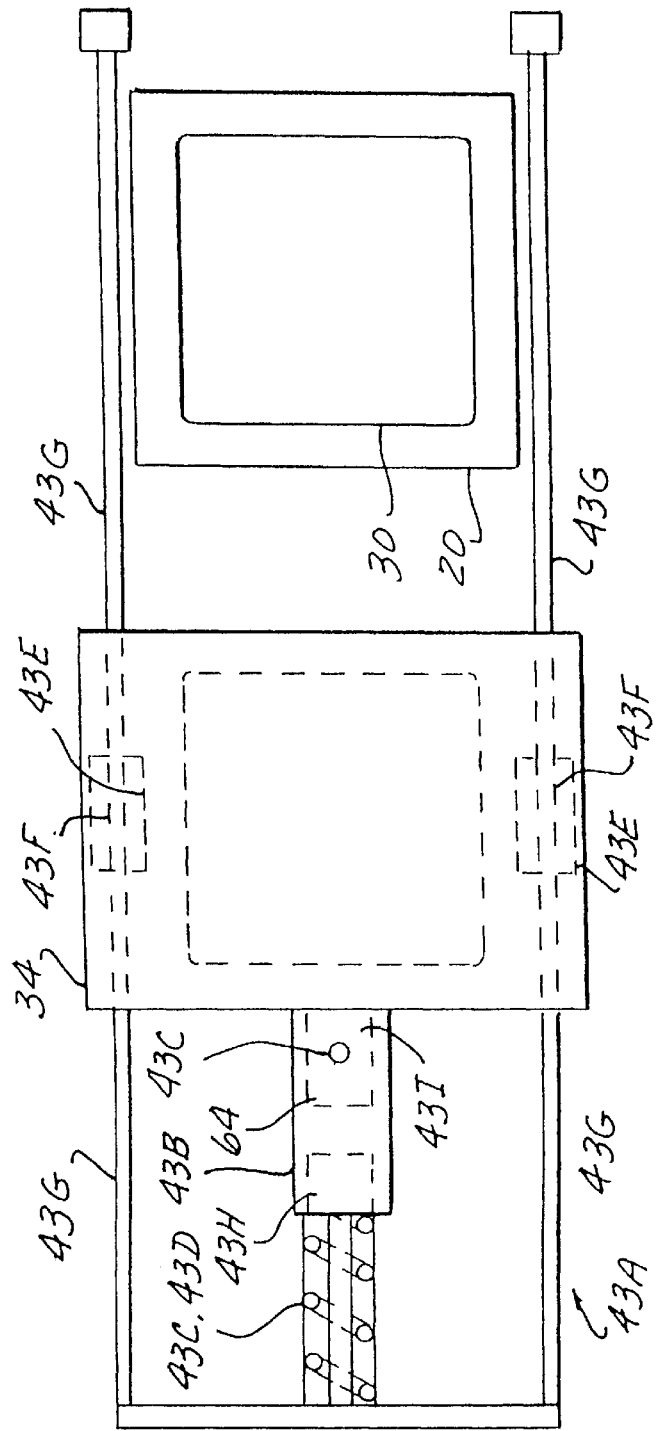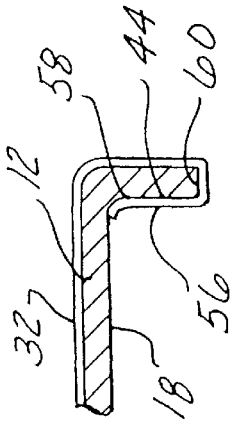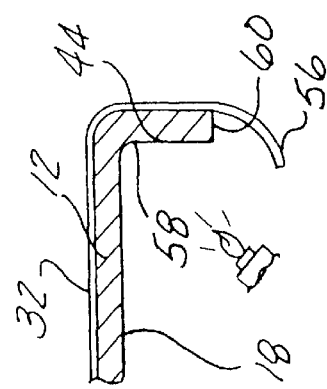

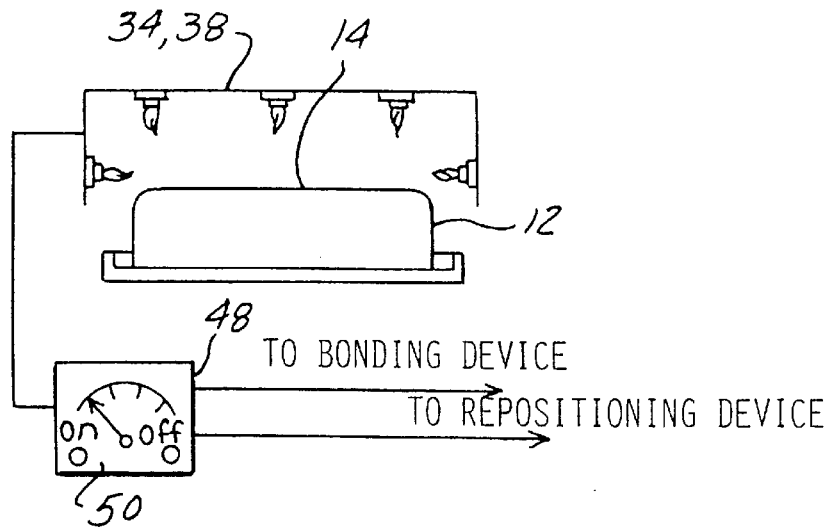
FIG-6
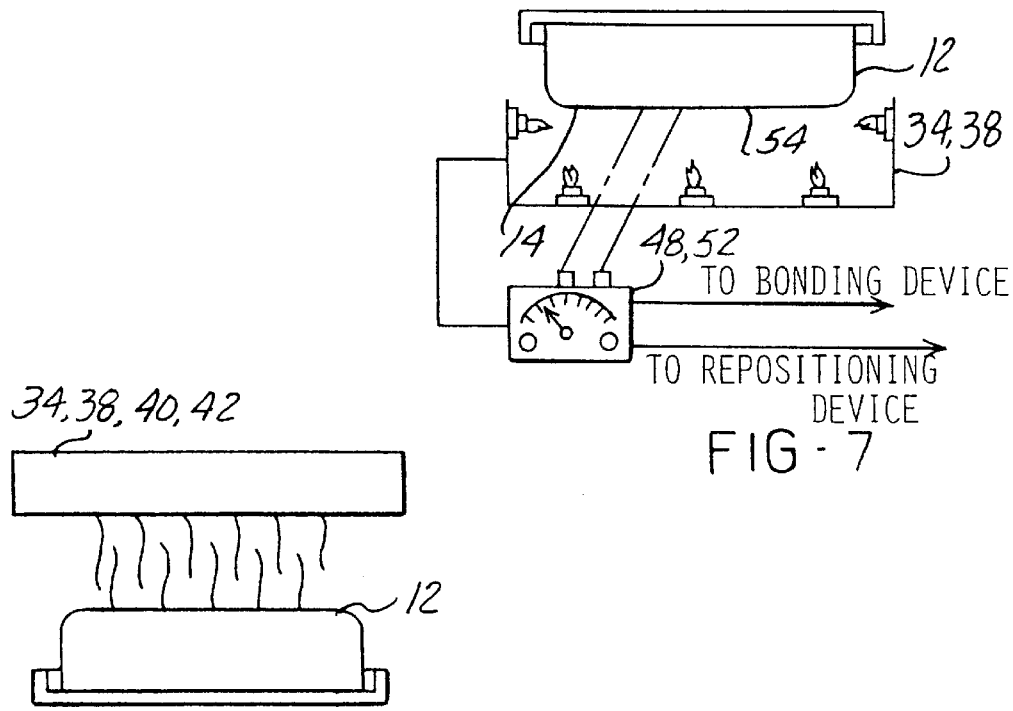
FIG-7
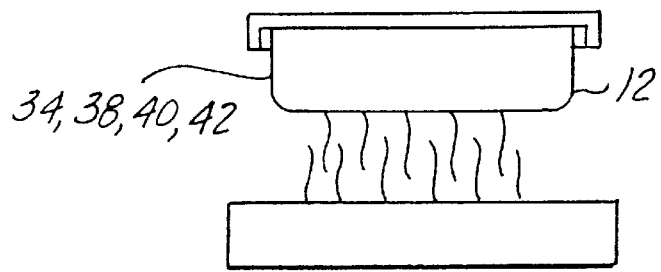
FIG-8
FIG-9

METHOD FOR MANUFACTURING A COMPOSITE

This application is a CONTINUATION of application Ser. No. 08/354,288, filed on Dec. 12, 1994, now abandoned.

BACKGROUND OF THE INVENTION

This invention relates to a new method and apparatus for manufacturing a composite containing a substantially rigid, preformed thermoplastic substrate bonded to a bonding layer of material.

More specifically, this invention describes a new and improved method and apparatus for bonding a thermoplastic substrate to a bonding layer to make a composite such as an automotive interior trim panel, without impairing or damaging the substrate or the appearance of an external surface of the bonding layer.

A variety of techniques and types of apparatus have been used or proposed for use to create composites useful in structural or decorative panels, such as automotive or truck interior trim panels, package trays and the like. It is an important consideration to the manufacture and use of such composites that the individual components going into the composite are combined in a manner that provides a substantially uniform, completely bonded relationship between them. Furthermore, this bonded relationship should be created so that none of the components, or any appearance surfaces of the components, are significantly marred, damaged or deformed by the manufacturing process.

In making composites that are used as interior trim panels or for similar purposes, a difficulty may arise in obtaining appropriate bonds between components. This is particularly true where at least one of the materials to be bonded comprises a thermoplastic material. Polyolefins are an example of a category of thermoplastic materials which may present bonding problems. For example, polypropylene and polyethylene are resistant or virtually impervious to many chemical agents which one would normally use to enable bonding of such materials to other components. Agents which may be strong enough or of a chemical composition which will adequately attack (by wetting) the polyolefin surface to enable bonding also frequently include or release toxic or environmentally unsafe hazardous materials, making use of such agents undesirable or unacceptable.

Some agents are used to act as adhesives that are activated by such techniques as applying heat and/or pressure, rather than simply to wet a surface to increase susceptibility to bonding. Use of adhesives increases cost and adds a manufacturing step. Typical adhesives used for this purpose frequently do not work well with the polyolefin family of materials unless the adhesive is strong enough that it displays the toxic or hazardous material characteristics discussed above. Thus, adhesives are not a desirable solution to these problems, and in fact often add to the difficulties.

Bonding problems are particularly prevalent where one of the components comprises a preformed substantially rigid thermoplastic substrate. Where, for example, the substrate comprises a polypropylene or polyethylene substrate, materials which are compatible (ie. thermoplastics of similar composition), and those which are incompatible (ie. cloth, or other materials of dissimilar composition) are each difficult to bond to the substrate.

Polyolefin film, polyethylene foam and polypropylene foam are examples of materials which are compatible with thermoplastic substrates. The bond that may be formed between these materials is typically achieved through a chemical reaction. A cohesive bond is formed by mixing of the two materials to form one bonded component—assuming the surface of one component can be wetted or otherwise made to blend with the other component. Achieving that mixing is difficult without use of strong outside (and potentially toxic/hazardous) adhesives or chemical agents, or without applying potentially damaging heat and/or pressure to the components to force bonding action to occur.

With incompatible materials, such as polyolefin substrates and polyurethane foam, desired bonding may be achieved by extrusion of one material into porous areas of the other, to form what may be described as a mechanical bond. Once again, difficulty arises in causing such extrusion to occur without damaging the components or using toxic/hazardous additive materials.

It is sometimes possible to form a bonded composite by melting a thin layer of material onto a substrate. That approach does not, however, produce an acceptable bonded composite, where it is unacceptable to subject the components to unpredictable dimensional changes, alteration in appearance surfaces, or other damage that can occur with melting of one of the components.

Any approach that uses uncontrolled heat to assist in formation of a bond risks undesirable alteration of the components being bonded. This is frequently a problem when one of the components comprises a preformed substantially rigid substrate of a thermoplastic material. Although the dimensional characteristics, and configuration of such a substrate have, prior to the bonding step, already been formed (by injection molding, or any other molding or forming technique), the result may not be permanent.

Thermoplastic substrates are different from thermosetting plastic products, in that the former are more susceptible to alteration of configuration and even complete melting upon being reheated. This alteration may occur in a bonding operation. Thermosetting products do not have substantially the same characteristics. In using thermoplastic substrates to create a bonded composite it is desired to create the composite without melting, deforming or stressing the substrate through excessive or uncontrolled heat and pressure. Yet any heat and pressure used to create a bond to the substrate may lead to these exact types of problems in the substrate or other layer of the composite. Examples include heat soaking the entire substrate, leading to warping or other deformation of the preformed configuration or dimensional tolerances of the substrate; melting of the substrate in localized or broader areas; and melting or otherwise damaging the bonding layer, or an appearance surface of that bonding layer. It is also possible that any alteration of the substrate configuration or thickness that affects the bonding surface may directly impact the degree to which a complete and uniform bond is created over the entire bonding surface. Such imperfections in the substrate bonding surface may result in less than the desired substantially uniform, complete bond to a bonding layer. Uncontrolled heating of the substrate may also result in warping or deformation of the substrate when relatively high clamping pressure of molding or other bonding techniques is utilized.

It can be seen, therefore, that the problem with bonding thermoplastic substrates to bonding layers may not simply be inherent to the type of components used. The problem in finding a workable bonding approach without damaging the constituent components goes beyond the components' characteristics. Any manufacturing approach to solving this bonding problem involving the uncontrolled application of heat to one or more components may lead to additional bonding problems, or damage to the substrate or bonding layer. To properly manufacture the composite, any application of heat must be controlled to cause substantially complete, uniform bonding to occur while avoiding any significant damage to the components of the composite. Relatively low clamping pressures are also preferred for the same reason.

Separate problems may arise in trying to solve bonding difficulties with adhesives. As noted, many adhesives used to improve the bonding in a composite (that particularly will aid in bonding to thermoplastic substrates) may also constitute or release hazardous chemicals into the environment. This is often a result of the application of heat and pressure in the bonding process. Elaborate and costly containment equipment and steps must then be utilized to comply with applicable environmental laws, as well as to safeguard the workplace and employees. This makes adhesives with these characteristics impractical to use, regardless of their effectiveness in bonding the pertinent components.

Thus it can be seen that a need exists for a manufacturing approach which will provide a substantially uniform, complete bond between components, avoid the problems described above, and yet prove efficient and cost effective. It is therefore, an object of the present invention to substantially eliminate the use of adhesives in bonding a thermoplastic substrate with a bonding layer, thereby typically avoiding an extra manufacturing step and reducing the cost and risk of exposure to potentially hazardous or toxic emissions from such adhesives.

It is a further object of the present invention to improve the bonding capability of polyolefin substrates, including thermoplastic and polypropylene substrates, to other plastic and non-plastic bonding layers of material, while reducing or substantially eliminating damage to the components being bonded.

Yet another object is to minimize the potential waste, damage and destruction of composite components being bonded (including thermoplastic substrates and bonding layers) that is caused by uncontrolled application of heat and/or use of relatively high clamping pressure in creating the composite in a mold or similar bonding device, and consequent heat soaking, warping, surface damage and/or other deformation of the components.

It is yet another object of the present invention to provide an improved method and apparatus for making a composite permitting substantially uniform, complete bonding of the thermoplastic substrate to a bonding layer, which advantageously minimizes heat soaking, melting or otherwise damaging the composite components.

SUMMARY OF THE INVENTION

The present invention presents a solution to the problems described above, by providing an improved method and apparatus for making a bonded composite involving a substantially rigid, preformed thermoplastic substrate, whereby bonding to the substrate is improved, and the incidence of heat soaking, melting or other damage to components of the composite is substantially reduced.

The objects, benefits and advantages of the present invention accordingly are achieved by this improved method and apparatus for manufacturing a composite, whereby controlled heating is applied to cause a bonding surface of a preformed substantially rigid thermoplastic substrate to flow, followed by bonding of the bonding surface with a bonding layer without causing any substantial heat soaking, melting or other damage to the substrate or bonding layer.

In accordance with the method aspects of the present invention, a heater applies controlled heating to a preformed substantially rigid thermoplastic substrate having two parts, one a bonding surface, and the other being the residue of the substrate. "Controlled heating" is defined as applying heat of appropriate temperature for an appropriate period of time to cause the bonding surface to flow without causing substantial heat soaking, melting or other damage by warpage or otherwise to the residue of the substrate or a bonding layer. The substrate and a bonding layer comprising the second component of the composite are placed in a bonding device such as a two piece mold, having a first and second piece in opposing relation to each other. The bonding surface will thereupon face a bonding cavity defined by the opposing first and second pieces, and the residue will contact the first piece. The bonding device is closed, bringing the bonding layer into substantially complete surface contact with the substrate bonding surface at points of contact defined as an "interface," while the bonding surface remains in a flowing condition. This flowing condition is defined as a "flow state." A substantially complete and uniform bond is thus formed at the interface, resulting in the desired composite.

In accordance with an apparatus aspect of the present invention, a bonding device is connected to a heater capable of providing controlled heating of the substrate. The bonding cavity will accept the substrate and the bonding layer, such that following controlled heating the bonding device may be closed to bring the bonding layer and substrate into substantially uniform, complete contact at the interface while the bonding surface is in a flow state. A bond is thus formed as the bonding surface cools. The apparatus thus completes formation of the desired composite by combining the substrate and bonding layer into a substantially complete, uniform bonded relationship.

BRIEF DESCRIPTION OF THE DRAWINGS

Other objects, features and advantages of the present invention will become apparent after reference to the following detailed description and drawings, wherein:

FIG. 2A is a top view of a movable heater and a bonding device, showing preferred embodiments of a transfer assembly utilizing a fluid actuated piston;

FIG. 3A is a partial front cross sectional view of a substrate showing the application of controlled heating to localized areas of a substrate mold surface, in preparation for bonding a folded extension of a bonding layer to the mold surface;

FIG. 3B is a partial front cross sectional view of a substrate showing a folded extension of a bonding layer brought into pressurized contact with a localized area of the substrate mold surface for bonding purposes, following the controlled heating illustrated in FIG. 3A;

FIG. 6 is a schematic front view of a movable or externally positioned heater showing a controlled heating approach for flame impingement from above the substrate;

FIG. 7 is a schematic front view of a movable or externally positioned heater showing a controlled heating approach for flame impingement from below the substrate;

FIG. 8 is a front view of a movable or externally positioned heater showing a controlled heating approach for infrared heat or hot air heat impingement from above the substrate;

FIG. 9 is a front view of a movable or externally positioned heater showing a controlled heating approach for infrared heat or hot air heat impingement from below the substrate.

DETAILED DESCRIPTION OF THE PREFERRED EMBODIMENTS

Figure 1:
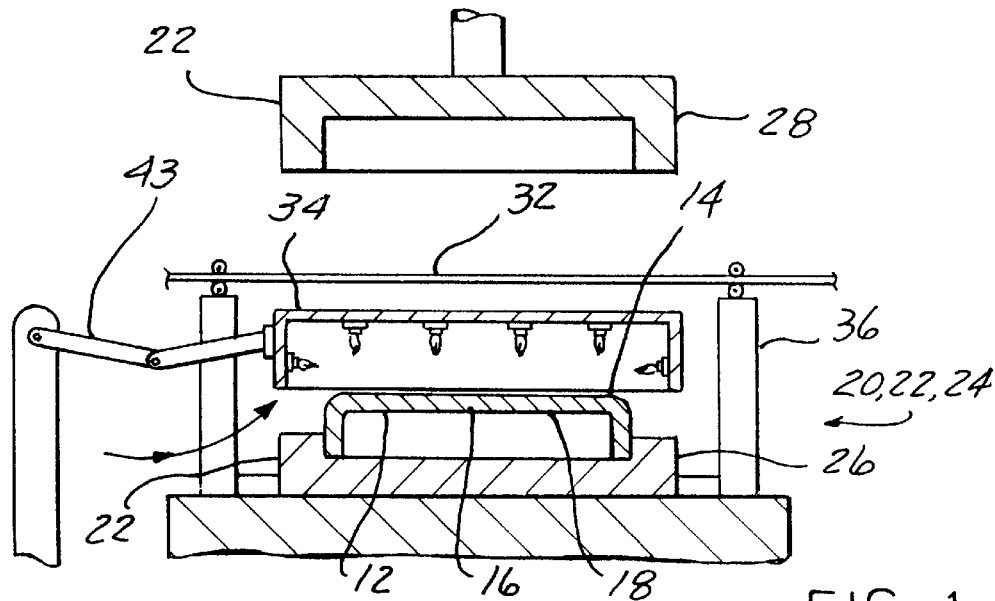
FIG. 1 is a cutaway, front cross sectional view of a typical bonding device in the form of a mold, for forming a composite in accordance with the present invention, showing an embodiment with a movable heater in the mold.

Referring now in detail to the drawings, a typical process for making a composite 10 (shown in FIG. 3) in accordance with the present invention is illustrated in FIG. 1. As shown, a preformed substantially rigid thermoplastic substrate 12 is provided, comprising a bonding surface 14 contiguous to a residue 16, whereby the residue 16 has a mold surface 18 in generally opposing orientation to the bonding surface 14. The substrate 12 is positioned in a bonding device 20 which may, for example, be a two-piece mold 22, a press 24 or any other device for bonding components. The bonding device 20 in this embodiment has a first piece 26, against which the substrate 12 is positioned, and a second piece 28 that is placed in opposing relation as shown in FIG. 1 to the first piece 26 so as to define a bonding cavity 30 (see FIG. 2) between the bonding device pieces 26 & 28. "Preformed," as used in this document, means previously created, rather than referring to a type, method or act of forming.

A bonding layer 32 is also placed in the bonding device 20, in contact with or adjacent to the second piece 28 of the bonding device 20, and retained in position by any conventional method. A movable heater 34 is positioned in the bonding cavity 30 between the bonding layer 32 and the substrate 12. The movable heater 34 is preferably oriented such that heat impingement may be primarily directed at the substrate bonding surface 14, rather than at the bonding layer 32. The movable heater 34 preferably is placed closer to the substrate 12 than to the bonding layer 32. The bonding layer 32 may be held in position prior to closing of the bonding device 20 by positioning it upon a plurality of bonding layer supports 36 as shown in FIG. 1, although any other conventional fastening or positioning technique may be used to hold or retain the bonding layer 32 in the desired position in the bonding device 20.

Once the substrate 12, bonding layer 32 and movable heater 34 are in place in the bonding device 20 as described, the bonding surface 14 of the substrate 12 may be subjected to "controlled heating" as in FIG. 1. "Controlled heating" is defined to mean applying heat of appropriate temperature for an appropriate period of time to cause the bonding surface 14 to flow without causing substantial heat soaking, melting or other damage, by warpage or otherwise, to the residue 16 of the substrate 12 or the bonding layer 32. The flowing condition of the bonding surface 14 upon completion of controlled heating will be described as a "flow state." A movable heater 34 or other heater 38 (FIG. 6 or 7) may be used in applying controlled heating. The movable heater 34 or other heater 38 may, for example, be of the type providing open flame heat impingement (FIG. 1), infrared heat impingement (by an infrared heater 40) or hot air impingement (by a hot air heater 42) which are illustrated in FIGS. 8 or 9.

As shown in FIG. 1, open flame heat impingement may occur with the movable heater 34 oriented to provide heating to the bonding surface 14 from above the substrate 12, or as shown in FIG. 7, the preferred approach is the movable heater 34 may be oriented to provide open flame heat impingement to the bonding surface 14 from below the substrate 12. Heating from below the substrate 12, particularly is preferred with open flame impingement because it provides enhanced control over the flame and flame temperature. Controlled heating should be primarily applied to the bonding surface 14 of the substrate 12 (rather than to the bonding layer 32), whether the heat impingement occurs from above or below the substrate 12. This means that the main difference between the two embodiments is a 180° rotation of the bonding device 20 and its contents. The relationship between the position of the first piece 26, the substrate mold surface 18, the bonding layer 32, the second piece 28 and the movable heater 34 is otherwise virtually the same in each embodiment. In one embodiment, the heat impingement simply occurs from above, and in the other embodiment, it occurs from below the substrate 12.

Alternative heater embodiments involving an infrared or hot air heater 40, 42 respectively, may be used for providing heat from above the substrate 12 as shown in FIG. 8, or from below the substrate 12 as shown in FIG. 9. Any other movable heater 34 may instead be used (from above or below the substrate 12) which is capable of providing controlled heating, as defined.

Referring again to the embodiment shown in FIGS. 1–3, the composite 10 resulting from the method of the present invention is made as follows. Once the movable heater 34 is positioned in the bonding cavity 30, along with the substrate 12 and bonding layer 32, the movable heater 34 is activated. Controlled heating is then provided to the bonding surface 14. Upon the bonding surface 14 reaching a flow state, the movable heater 34 may be removed from the bonding cavity 30. The movable heater 34 may either turn off upon completion of the controlled heating cycle, or operate continuously but move out of the bonding cavity 30 when the bonding surface 14 flow state is achieved.

The movable heater 34 may be cyclically repositioned into and out of the bonding device 20 by any standard approach. One approach is to connect the movable heater 34 to the bonding device 20 by a movable arm 43 as shown in FIG. 1. This movable arm 43 operates to reposition the movable heater 34 by pivoting in a horizontal and/or vertical direction.

Another approach, which is preferred over the movable arm 43, is to use a transfer assembly 43A, in the manner illustrated in FIG. 2A. The transfer assembly 43A includes a fluid actuated piston 43B. The piston 43B is connected at one end to a base and pressurized fluid supply (not shown). The other end is connected to the movable heater 34, so that as a forward fluid pressure level changes to cycle the piston 43B toward and away from the bonding device 20, the movable heater 34 is cycled into and out of the bonding cavity 30. A reset device 43C, such as a spring 43D, may be made a part of the assembly 43A as desired to reset the piston 43B upon release of forward fluid pressure. The movable heater 34 is preferably equipped with a plurality of linear bearings 43E which each define a central opening 43F capable of receiving a shaft 43G extending generally parallel to a longitudinal axis of the piston 43B. The fluid actuated piston 43B, in conjunction with the linear bearings 43E and shafts 43G comprises the transfer assembly 43A. As the piston 43B cycles toward and away from the bonding device 20, the movable heater 34 is slidably repositioned along the plurality of shafts 43G. This is to provide relatively uniform, stable and repetitive movement of the movable heater 34 with each cycle. The piston 43B preferably has a first cavity 43H to enable application of forward fluid pressure. The reset device 43C may alternatively comprise a piston 43B having a ported second cavity 43I to enable application of reverse fluid pressure to reset the piston 43B and the movable heater 34 away from the bonding device 20. In this embodiment, the term "fluid" as used with reference to a fluid actuated piston 43B, is intended to comprise either air or liquid.

Figure 3:
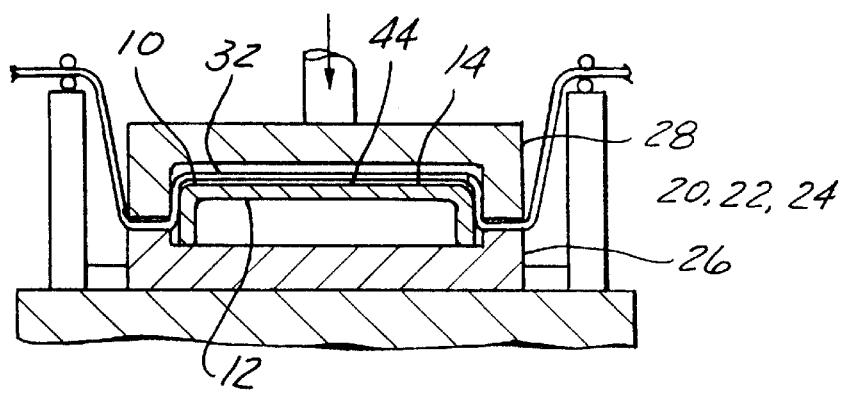
FIG. 3 is a cutaway, front cross sectional view of the embodiment shown in FIG. 2, showing the mold in a closed position.

In either case, once the movable heater 34 is removed from the bonding cavity 30, the bonding device 20 is closed as in FIG. 3 while the bonding surface 14 is still in a flow state. This brings the substrate bonding surface 14 and the bonding layer 32 into pressurized contact, at points of contact described as an "interface" 44 between the bonding layer 32 and the bonding surface 14, and causes a substantially complete and uniform bond to be created at that interface 44. The bonding device may be closed for the necessary time frame to form a bond at the interface 44, with relatively low clamping pressure. While other pressure levels will work, clamping pressure in the 10 to 100 psi range is preferred. An appropriate clamping time needed to complete bonding of the composite 10 at the interface varies with the pressure and thickness of the substrate 12, but 2–15 seconds is an exemplary range. Where the substrate is approximately three millimeters in thickness, clamping time of approximately 5 seconds may be estimated as appropriate; and with a substrate of approximately 6 millimeters thickness, approximately 15 seconds may be estimated as appropriate. Variations of time from these periods will also work, and may be useful depending upon the level of temperature reached by the bonding surface 14 in the controlled heating operation. An appropriate clamping time thus may further vary with the time needed to sufficiently cool the flow state of the bonding surface 14 to form a bond. The bonding device 20 should be held in a closed, clamped position for a sufficient time to permit the components to be bonded into a composite 10. Excessive clamping time should be avoided.

Once the bond is created, the bonding device 20 may be opened and the composite 10 removed. If trimming or cutting of the bonding layer 32 is desired to remove excess material, that operation may be performed at this point. In the event the bonding layer 32 has been inserted in the bonding device 20 in an appropriate shape, no trimming, cutting or further operations are generally necessary.

Controlled heating may be conducted at a variety of different time and temperature combinations, yet still produce an acceptable flow state in the bonding surface 14. This is a beneficial aspect of the invention, because heaters 38 may vary significantly in the temperature at which heat impingement may be delivered. A temperature elevated above the melting point of the substrate 12 material is preferred for the heat impingement to provide controlled heating rather than uncontrolled heating of the substrate 12.

The lower the heating temperature, the longer the time needed to cause a flow state in the bonding surface 14. While a particular temperature level above the substrate 12 melting point is not mandated to achieve controlled heating, using a relatively low temperature increases the risk that heat soaking or melting of the residue 16 will occur, with a possibility of warpage or other deformation as well. Without limitation to any one theory, this may in part be because of the longer period of heating needed to achieve a flow state. Controlled heating may be achieved through heat impingement at an appropriate temperature, maintained for an appropriate period to cause a flow state in the bonding surface 14. It does not, however, occur through heating at either a temperature or for a time period which substantially heat soaks, melts or otherwise deforms the residue 16 or the bonding layer 32. Thus, the heating need be controlled through use of appropriate temperature and time combinations to substantially ensure that the desired controlled heating results.

Figure 4:
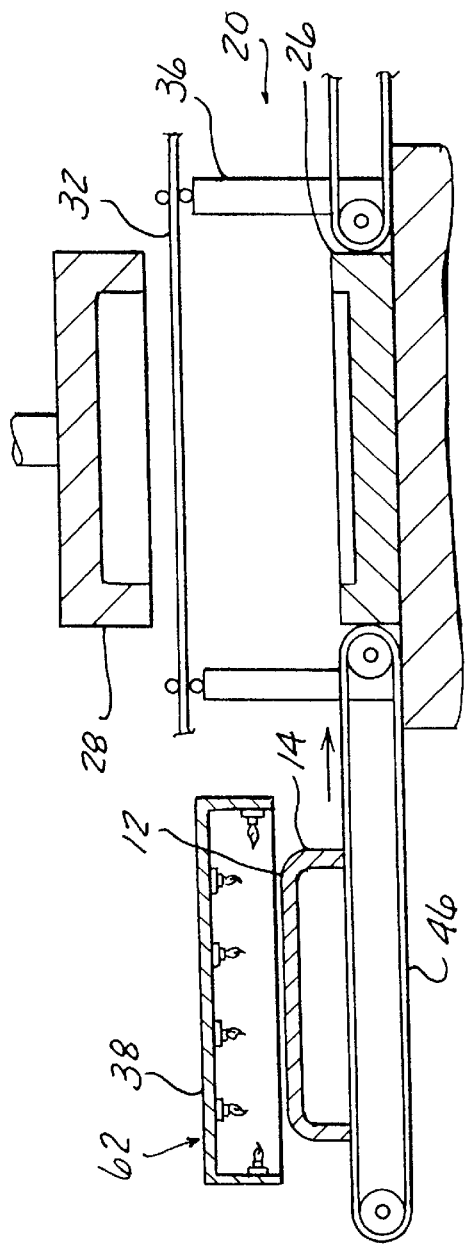
FIG. 4 is a cutaway, front cross sectional view of an alternative mold arrangement for forming a composite in accordance with the present invention, showing an embodiment with a heater in adjacent but external position relative to the mold for heating a substrate.
Figure 5:
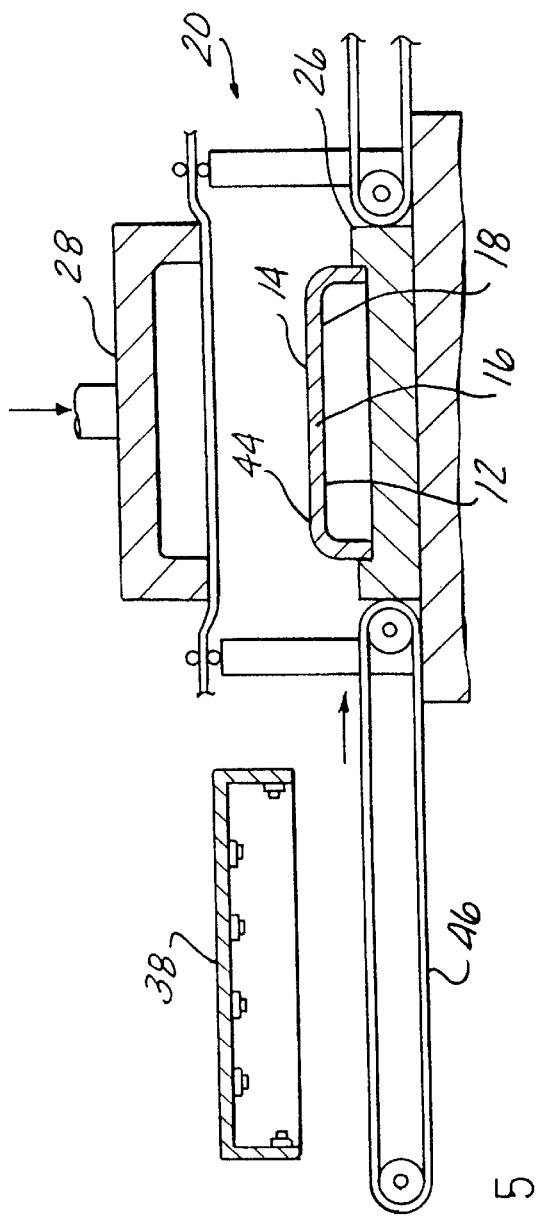
FIG. 5 is a cutaway front cross sectional view of the embodiment shown in FIG. 4, showing the substrate repositioned into the mold.

Referring now to an alternative embodiment of the method of the present invention shown in FIGS. 4 & 5, a heater 38 is provided in a position external and adjacent to the bonding device 20, in place of the movable heater 34 shown in the embodiment of FIG. 1. As with the embodiment described in FIGS. 1–3, the FIG. 4–5 embodiment may be practiced with any heater 38 capable of providing controlled heating. As such, a heater 38 providing open flame, infrared or hot air heat impingement, or other heating techniques may be used in the embodiment.

As shown in FIG. 4, a heater 38 and a bonding device 20 are provided in reasonably adjacent proximity to each other. The substrate 12 is placed in position for the bonding surface 14 to receive heat impingement from the heater 38, and controlled heating is applied.

The bonding layer 32 is positioned in the bonding device in similar position to that described for the embodiment of FIG. 1. Upon completion of the controlled heating operation, the substrate 12 is repositioned relative to the heater 38 and the bonding device 20 to permit the bonding step to be completed. This repositioning may be conducted by activating a repositioning device 46 to place the substrate 12 in the mold in the same relative position to the bonding layer 32 and bonding device 20 as is shown in FIG. 2. The repositioning device 46 may take the form of any transfer mechanism that operates to cause the substrate 12 to be repositioned from the heater 38 into the desired bonding device position. Examples include any conventional feed system or powered transfer tracks to move the substrate 12 between the heater 38 and the bonding device 20. Further exemplary techniques include powered transfer tracks or a movable carriage system that moves the heater 38 and bonding device 20 relative to the substrate 12, so the bonding device 20 is repositioned about the substrate 12 in the desired position for bonding.

This repositioning may be accomplished with the heater 38 and the bonding device 20 connected so as to move as a unit relative to the substrate 12, or by independent movement of the heater 38 and bonding device 20 to achieve the repositioning of the substrate 12. Once the repositioning takes place, the repositioning device 46 resets to prepare for the repositioning applicable to the next substrate 12 being heated.

These embodiments of the present invention may utilize any of the alternate heater types and orientations previously referenced in FIG. 1, 8 or 9.

In accordance with the embodiment disclosed in FIGS. 4–5, the composite 10 produced by the method of the present invention is made as follows. The substrate 12 is positioned to receive heat impingement from the heater 38, and controlled heating is applied. Once the bonding surface 14 is in a flow state, the repositioning device 46 is cycled to cause the substrate 12 to be repositioned in the bonding device 20, in the appropriate relative position for the bonding operation as previously described with reference to FIGS. 1–3. Repositioning of the substrate 12 should be accomplished while the bonding surface 14 substantially remains in a flow state. The flow state must substantially continue for a sufficient duration after repositioning the substrate 12 to permit the bonding device 20 to be closed, and a bond created at the interface 44.

Figure 2:
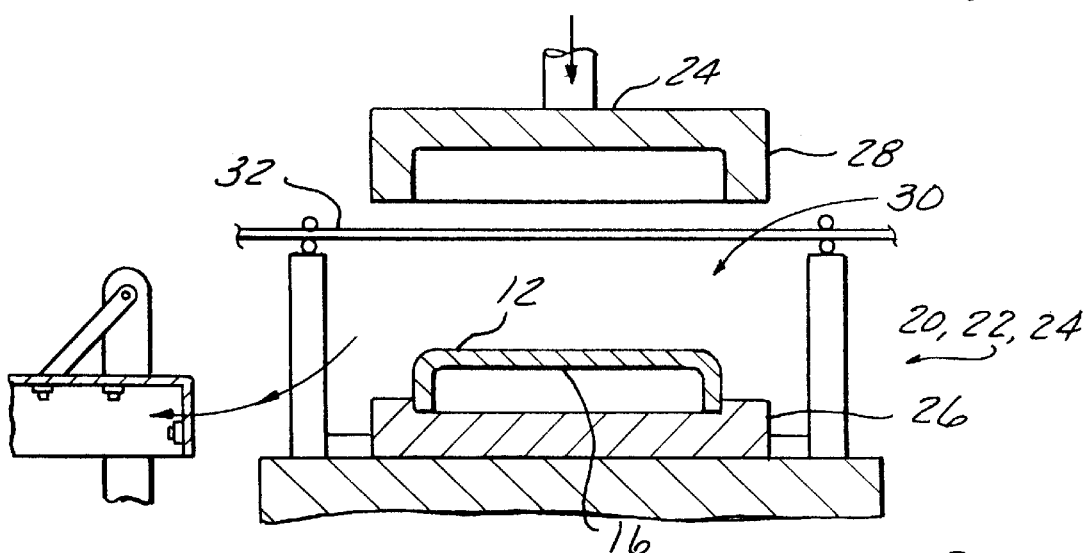
FIG. 2 is a cutaway, front cross sectional view of the embodiment in FIG. 1, showing a movable heater removed from the mold.

Once the substrate 12 is repositioned in the bonding device 20, the bonding device 20 is closed (as shown in FIG. 3) for a similar duration and under similar clamping pressure as is described in the embodiment of FIGS. 1–3. This permits formation of a bond at the interface 44. Upon completion of the bonding operation, the bonding device 20 may be opened and the resulting composite 10 removed.

Any desired trimming, cutting or other desired optional operations may then be completed. In all other substantial respects, the steps of the embodiment described with reference to FIGS. 4–5 are the same or similar to the steps representing the embodiment described with reference to FIGS. 1–3.

In any embodiments of the present invention described, optional further method steps may be incorporated to improve the precision with which controlled heating is applied, and the composite 10 formed. Because of the variable temperature at which controlled heating may be conducted, it is desirable to precisely control either or both of the heating duration or the bonding surface 14 temperature. In doing so, the heating cycle may potentially be terminated at a more precise point than is possible when relying upon manual timing or observation of the existence of a flow state.

One approach to achieve this enhanced control is to provide a control unit 48 to control the duration of the heat impingement. FIG. 6 is exemplary of this approach, whereby a control unit 48 is connected to the movable heater 34 or the heater 38 positioned outside the bonding device 20, as applicable. One example of a control unit 48 useful for this purpose is a timer 50, shown in FIG. 6, although others would work. The timer 50 is present to improve the precision with which a heater 34, 38, 40, 42 provides heat impingement for a specified duration. Upon completion of the preset time, the timer 50 shuts off the heater 34, 38, 40, 42 and/or may signal any movable heater 34 to move out of the bonding device 20. Where an externally positioned heater 38 is in use, the timer 50 may shut off the heater 38, and/or signal the repositioning device 46 to start the step of repositioning the substrate 12.

In the context of a heater 34, 38 delivering open flame heat impingement, the timer 50 may operate by controlling the source of the flame, such as a natural gas supply. With a hot air heater 42 or an infrared heater 40, the timer may be set up to control the energy source, typically the electric supply. Any other conventional approach to controlling operation of the heater 34, 38, 40, 42 may alternatively be used.

In conjunction with, or as an alternative to a timer 50, a surface temperature sensing control unit 52 may be utilized as a control unit 48. An example is shown in FIG. 7. The initial purpose of this sensing control unit 52 is to sense the temperature at an outer edge of the bonding surface 54. The bonding surface 14 represents the portion of the substrate 12 that is placed in a flow state by controlled heating. The "outer edge" 54 is defined as the outer contour of the bonding surface 14, as shown on FIG. 7.

The measurable temperature at the outer edge of the bonding surface 54 during controlled heating operations will typically be greater than the temperature at a given point inside the bonding surface 14. Thus, the bonding surface 14 may reach a flow state without the temperature inside the bonding surface 14 rising to approximately the temperature emitted by a heater 34, 38, 40, 42 or achieved at the outer edge 54 in the controlled heating operation. It is preferred, therefore, that a surface temperature sensing control unit 52 for measuring the outer edge 54 temperature be calibrated to control the heat impingement and/or the repositioning device 46 upon the outer edge 54 reaching a predetermined temperature adequate to reflect a flow state has been achieved, although that temperature may not be uniform throughout the bonding surface 14.

An outer edge 54 temperature indicative that the bonding surface 14 has achieved a flow state should be at least the melting point of the thermoplastic material comprising the substrate 12 for any of the heating techniques described.

Other temperatures may be utilized, depending upon the period of time desired between the end of the heating cycle, and the closing of the bonding device 20. This may, of course, vary with the embodiment used. Different time frames may be needed, for example, to remove a movable heater 34 from a bonding device 20, as opposed to repositioning the substrate 12 in a bonding device 20.

A surface temperature sensing control unit 52, shown in FIG. 7 may be connected to a movable heater 34, and/or to the repositioning device 46, to signal the end of a heating cycle based upon sensing a preset outer edge 54 temperature. In this manner the sensing control unit 52 detects when the bonding surface 14 is in a flow state. The signal may be directed to control the removal of a movable heater 34 from the bonding device 20, or to activate the repositioning device 46 to reposition the substrate 12 in the bonding device 20. The control unit 52 may also, if desired, be utilized to cause actual shutoff of any heater 34, 38, 40, 42.

FIGS. 3A & 3B are illustrative of a further alternative embodiment of the method aspect of the present invention, which involves incorporation of additional steps to permit formation of a uniform bond between folded extensions 56 of the bonding layer 32 and localized areas 58 of the mold surface 18. In this manner a desired appearance surface for the composite 12 may be maintained, and each edge 60 of the substrate 12 may similarly be uniformly bonded without loss of appearance. These steps comprise applying controlled heating to localized areas 58 of the mold surface 18 of the substrate 12 in proximity to each edge 60 of said substrate 12; and then causing pressurized contact at an interface 44 between the folded extensions 56 and the mold surface 18 while the bonding surface 14 is in a flow state, to form a bond at said interface 44. The folded extensions 56 are portions of the bonding layer 32 overlapping the edges 60, and folded onto the mold surface 18 by conventional techniques. Only the portions of the mold surface 18 to be bonded to the folded extensions 56 need receive controlled heating, and thus that step is performed in only localized areas 58 of the mold surface 18 in proximity to the edges 60 of the substrate 12.

Referring now to an apparatus aspect of the present invention, an apparatus (as shown in FIGS. 1–3) for making a composite will be described.

In accordance with the apparatus illustrated in FIG. 1, a bonding device 20, which may be in the form of a two piece mold 22, is provided having a first piece 26 and a second piece 28 in opposing relation to each other so to form a bonding cavity 30 with the mold 22 in an open position. The mold 22 is equipped with a movable heater 34 which either may be manually operated, or have start and stop functions operated by a control unit 48. The movable heater 34 may be connected to the mold 22, or a free standing unit. In either case, there will be at least two possible positions through which the movable heater 34 may be cycled in the manufacture of a single composite 10. The first movable heater 34 position is inside the bonding cavity 30. In the manufacture of a composite 10 with the subject apparatus, a preformed substantially rigid thermoplastic substrate 12 having two generally opposing surfaces described as a bonding surface 14 and a mold surface 18 is provided in the mold 22. The mold surface 18 of the substrate 12 is positioned against the first piece 26 of the mold 22, making the bonding surface 14 face the bonding cavity 30. It is this bonding surface 14 toward which the movable heater 34 is oriented when in operable position in the bonding cavity 30. Heat impingement during movable heater 34 operation will be principally directed toward the bonding surface 14 because of this orientation. The movable heater 34 may be any type of heater capable of producing controlled heating, as defined herein, to the bonding surface 14. Examples would be the open flame, infrared and hot air heaters previously described. The apparatus may be oriented for heating to occur from any of the directions shown in FIGS. 8–9.

A second position the movable heater 34 may occupy will be external to the bonding cavity 30 and the mold 22. Referring to FIGS. 1 and 2A, a transfer assembly 43A is connected to the movable heater 34 and the bonding device 20, and operates to cyclically insert and then remove the movable heater 34 from the bonding cavity 30. FIG. 1 illustrates one embodiment of a transfer assembly 43A using a movable arm 43 to swing the movable heater 34.

The alternative embodiment of a transfer assembly 43A shown in FIG. 2A is preferred, whereby the transfer assembly 43A comprises a fluid actuated piston 43B connected to the movable heater 34, and a plurality of shafts 43G communicating with the bonding device 20 and the movable heater 34. The movable heater 34 is attached to a plurality of linear bearings 43E which each define a central opening 43F through which a shaft 43G is slidably positioned. The piston 43B forms a first cavity 43H into which fluid pressure may be applied, thereby slidably moving the movable heater 34 into the bonding cavity 30 along the shafts 43G. The transfer assembly 43A may further comprise a reset device 43C which in combination with the release of fluid pressure from the first cavity 43H, causes the movable heater 34 and piston 43B to be repositioned outside the bonding cavity 30 upon completion of controlled heating. The reset device 43C may comprise a spring 43D connected to the piston 43B or alternatively to the movable heater 34. Alternatively the reset device 43C may comprise a ported second cavity 43I defined in the piston 43B to receive fluid pressure for resetting the piston 43B and movable heater 34. The alternatives of a spring 43D and a ported second cavity 43I are each shown in FIG. 2A, although use of any one reset device 43C should be sufficient in any given embodiment. For these purposes it should be noted that the term "fluid" is defined to comprise air, or alternatively, any liquid. Any other conventional transfer assembly 43A which operates to cyclically reposition the movable heater 34 into and out of the bonding device 20 will also work.

This movement function may also be controlled manually or by optional control unit 48. Typical control units 48 would be those described in the discussion of the method aspects of this invention, including timers 50 and surface temperature sensing control units 52. This enables the movable heater 34 location to change between the bonding cavity 30 and an external location to that bonding cavity 30 for conducting the respective functions of substrate 12 controlled heating and bonding of composite 10 components. Either by manual or control unit 48 monitoring of the controlled heating, the beginning and end of the desired substrate 12 heating cycle may be sensed; and the movable heater 34 may be started, stopped and moved between the bonding cavity 30 and external positions as appropriate. The operation of the control unit 48 in this regard, and the functions performed by each example of these control units 48 described in the method aspect of this invention are equally applicable to the apparatus aspects of this present invention.

A bonding layer 32 of material will be provided in the mold 22 as a second component of the composite to be manufactured with the subject apparatus. Any conventional approach may be used to retain the bonding layer 32 in a desired bonding cavity 30 position preparatory to composite 10 bonding operations. This may involve a plurality of bonding layer supports 36 as in FIG. 1 upon which the bonding layer 32 may be retained. Retention of the bonding layer 32 adjacent to or against the second piece 28 of the mold 22 by any fastening device may alternatively be used.

At least one of the first and second pieces 26, 28 will be movable, such as in the manner of a mold 22 or a press 24. Upon placement of the components of the composite 10 in the mold 22, completion of the substrate 12 controlled heating, and removal of the movable heater 34, the mold 22 may be closed.

The mold 22 may then be maintained in a closed position to permit the components to bond. This may preferably be done by supplying clamping pressure of from 10–100 psi. Clamping pressures above this range will also work, but are less desirable. This is because pressures in the specified range are easier to maintain, and involve lessened risk of causing excessive heat or pressure in the mold 22 that could damage the resulting composite 10 or prevent a substantially uniform, complete bonding of the components. Clamping pressures below the preferred range may properly work, but risk having insufficient pressure to retain the components in complete contact at the interface 44 to form the desired bond.

In alternative embodiments of the apparatus of the present invention, a movable heater 34 is replaced by a heater 38, 40, 42 as illustrated in FIGS. 4–5, of any type (including open flame, infrared or hot air) which may produce controlled heating of the substrate 12. The heater 38, 40, 42 is located outside the bonding cavity 30, but in reasonably adjacent proximity to the mold 22. The heater 38, 40, 42 defines a heating station 62 and is oriented to provide heat impingement to the substrate bonding surface 14 placed in the heating station 62 for that purpose. The heater 38, 40, 42 may be stationary, in which case a repositioning device 46 is also provided. This repositioning device 46 is placed in communication with the heater 38, 40, 42 and the mold 22, to reposition the substrate 12 out of the heating station 62 and into the bonding cavity 30 in preparation for composite 10 bonding.

An alternative arrangement may be provided whereby the heater 38, 40, 42 is not stationary. In this case a repositioning device 46 connected to the mold 22 and the heater 38, 40, 42 reposition the mold 22 and heater 38, 40, 42 relative to the substrate 12, following controlled heating. The substrate 12 ends up in the mold 22, just as in the arrangement with a stationary heater 38, 40, 42. The difference here is principally in moving the mold 22 and heater 38, 40, 42 rather than the substrate 12, in preparation for the bonding operation in the mold 22. This arrangement is otherwise substantially unchanged from the embodiment using a stationary heater 38, 40, 42.

The repositioning device 46 in each of the above embodiments may be any device that is capable of the repositioning functions described, including the feed systems, movable carriage system or powered tracks previously described.

Each of the apparatus embodiments described may be practiced with any of the types of heater 34, 38, 40, 42 and with either direction of heat impingement, shown in FIG. 1, 6, 7, 8 or 9.

The following are examples of open flame, infrared and hot air heat impingement conditions for achieving controlled heating which are exemplary, and are not meant to be the exclusive time and temperature combinations that will produce controlled heating. Other combinations, including temperatures below those specified, and heating times outside the periods described, will also work.

EXAMPLE 1

In this example, a composite 10 to be used as an automotive interior seat back panel was formed by use of the method described above with reference to open flame heat impingement. The substrate 12 and bonding layer 32 were each made of polypropylene material. At an open flame temperature of at least approximately 2000 degrees Fahrenheit, a flow state was achieved in a bonding surface 14 with a heating cycle of approximately 3–5 seconds. Examination of the resulting composite revealed a good, uniform bond was achieved throughout the interface 44 without any substantial heat soaking, deforming or other damage to the substrate 12 or the bonding layer 32.

EXAMPLE 2

In this example, a composite 10 to be used as an automotive interior seat back panel is made by use of the above method, with reference to infrared heat impingement. The substrate 12 and the bonding layer 32 are each made of polypropylene material. With infrared heating, a flow state is achieved with a heater 40 temperature of at least approximately 1200 degrees Fahrenheit, for a heating cycle of approximately 10–20 seconds. A good, uniform bond is anticipated throughout the interface 44, without substantial heat soaking, deformation or damage to the bonding layer 32 or the substrate 12.

EXAMPLE 3

In this example, a composite 10 for use as an automotive interior seat back panel was made by use of the above method, with reference to hot air heat impingement. The substrate 12 and bonding layer 32 were each made of polypropylene material. At a hot air temperature of at least approximately 800 degrees Fahrenheit, a flow state was achieved in a bonding surface 14 with a heating cycle of approximately 15–25 seconds. Examination of the resulting composite revealed a good, uniform bond was achieved throughout the interface 44 without any substantial heat soaking, deforming or other damage to the substrate 12 or the bonding layer 32.

Although only a few embodiments have been described in detail above, those having ordinary skill in the art will certainly understand that many modifications are possible in the preferred embodiment without departing from the teachings thereof. All such modifications are intended to be encompassed within the following claims. For example, the embodiment may include any type of heater 34, 38, 40, 42 capable of producing sufficient heat impingement to cause controlled heating of the substrate bonding surface 14. In addition, time and temperature combinations for substrate 12 heating outside the parameters described may be used as long as achieving controlled heating.

I claim:

1. A method of making a composite, comprising the steps of:
    placing a substantially rigid thermoplastic substrate and a bonding layer in a bonding device, the substantially rigid thermoplastic substrate having a bonding surface and a residue;
    applying controlled heating to the bonding device, to cause a flow state in said bonding surface of the substrate, wherein the step of applying controlled heating comprises applying heating of an appropriate temperature for an appropriate period of time to cause the bonding surface to flow without causing substantial heat soaking, melting or other damage, by warpage or otherwise, to the residue of the substrate or the bonding layer; and then
    closing the bonding device to cause pressurized contact at an interface between said bonding surface and said bonding layer while the bonding surface is in a flow state, to form a bond at said interface.

2. A method of making a composite as recited in claim 1, wherein controlled heating is conducted by a heater.

3. A method of making a composite as recited in claim 2, wherein said heater comprises a movable heater, and further comprising the step of cyclically repositioning the movable heater into and out of the bonding device before and after applying controlled heating.

4. A method of making a composite as recited in claim 3, wherein the substrate comprises a polyolefin material.

5. A method of making a composite as recited in claim 4, wherein the heater is capable of applying controlled heating by hot air impingement.

6. A method of making a composite as recited in claim 5, wherein hot air impingement is conducted for about 15–25 seconds at a temperature of at least about 800 degrees Fahrenheit.

7. A method of making a composite as recited in claim 6, further comprising the step of controlling the heater by a control unit, said control unit having a timer function.

8. A method of making a composite as recited in claim 6, further comprising the step of controlling the heater by a control unit, said control unit having a substrate surface temperature sensing function.

9. A method of making a composite as recited in claim 7, wherein the substrate comprises a polypropylene material.

10. A method of making a composite as recited in claim 8, wherein the substrate comprises a polypropylene material.

11. A method of making a composite as recited in claim 4, wherein the heater is capable of applying controlled heating by infrared heat impingement.

12. A method of making a composite as recited in claim 11, wherein infrared heat impingement is conducted for about 10–20 seconds at a temperature of at least about 1200 degrees Fahrenheit.

13. A method of making a composite as recited in claim 4, wherein the heater is capable of conducting controlled heating by flame impingement.

14. A method of making a composite as recited in claim 13, wherein flame impingement is conducted for about 3–5 seconds at a temperature of at least about 2000 degrees Fahrenheit.

15. A method of making a composite as recited in claim 14, further comprising the step of controlling the heater by a control unit, said control unit having a timer function.

16. A method of making a composite as recited in claim 14, further comprising the step of controlling the heater by a control unit, said control unit having a substrate surface temperature sensing function.

17. A method of making a composite as recited in claim 15, wherein the substrate comprises a polypropylene material.

18. A method of making a composite as recited in claim 16, wherein the substrate comprises a polypropylene material.

19. A method of making a composite as recited in claim 2, wherein said heater is positioned in external proximity to a bonding device containing the bonding layer; and further comprising the step of repositioning the substrate in the bonding device after applying controlled heating; and wherein the pressurized contact is caused by closing the bonding device.

20. A method of making a composite as recited in claim 19, wherein the substrate comprises a polyolefin material.

21. A method of making a composite as recited in claim 20, wherein the heater is capable of applying controlled heating by hot air impingement.

22. A method of making a composite as recited in claim 21, wherein hot air impingement is conducted for about 15–25 seconds at a temperature of at least about 800 degrees Fahrenheit.

23. A method of making a composite as recited in claim 22, further comprising the step of controlling the heater by a control unit, said control unit having a timer function.

24. A method of making a composite as recited in claim 22, further comprising the step of controlling the heater by a control unit, said control unit having a substrate surface temperature sensing function.

25. A method of making a composite as recited in claim 23, wherein the substrate comprises a polypropylene material.

26. A method of making a composite as recited in claim 24, wherein the substrate comprises a polypropylene material.

27. A method of making a composite as recited in claim 20, wherein the heater is capable of applying controlled heating by infrared heat impingement.

28. A method of making a composite as recited in claim 27, wherein infrared heat impingement is conducted for about 10–20 seconds at a temperature of at least about 1200 degrees Fahrenheit.

29. A method of making a composite as recited in claim 20, wherein the heater is capable of applying controlled heating by flame impingement.

30. A method of making a composite as recited in claim 29, wherein flame impingement is conducted for about 3–5 seconds at a temperature of at least about 2000 degrees Fahrenheit.

31. A method of making a composite as recited in claim 30, further comprising the step of controlling the heater by a control unit, said control unit having a timer function.

32. A method of making a composite as recited in claim 30, further comprising the step of controlling the heater by a control unit, said control unit having a substrate surface temperature sensing function.

33. A method of making a composite as recited in claim 31, wherein the substrate comprises a polypropylene material.

34. A method of making a composite as recited in claim 32, wherein the substrate comprises a polypropylene material.

35. A method of making a composite as recited in claim 1 wherein the composite is an automotive interior trim panel.

36. A method of making a composite, consisting of the steps:

placing a substantially rigid thermoplastic substrate and a bonding layer in a bonding device, the substantially rigid thermoplastic substrate having a bonding surface and a residue;

applying controlled heating to the bonding device, to cause a flow state in said bonding surface of the substrate, wherein the step of applying controlled heating comprises applying heating of an appropriate temperature for an appropriate period of time to cause the bonding surface to flow without causing substantial heat soaking, melting or other damage, by warpage or otherwise, to the residue of the substrate or the bonding layer;

closing the bonding device to cause pressurized contact at an interface between said bonding surface and said bonding layer while the bonding surface is in a flow state, to form a bond at said interface, whereby the composite is formed; and then removing the composite from the bonding device.

* * * * *